(12) United States Patent
Furukawa et al.

(10) Patent No.: US 8,597,940 B2
(45) Date of Patent: Dec. 3, 2013

(54) GAS DECOMPOSING APPARATUS

(75) Inventors: Keiji Furukawa, Nagasaki (JP); Mieko Murata, Nagasaki (JP); Yoshihiro Kuwahara, Saga (JP); Youihi Satou, Fukuoka (JP); Chieko Satou, Fukuoka (JP)

(73) Assignees: Keiji Furukawa, Nagasaki (JP); Yoshihiro Kuwahara, Saga (JP); Mieko Murata, Nagasaki (JP)

( * ) Notice: Subject to any disclaimer, the term of this patent is extended or adjusted under 35 U.S.C. 154(b) by 883 days.

(21) Appl. No.: 12/452,176

(22) PCT Filed: Jun. 25, 2007

(86) PCT No.: PCT/JP2007/062683
§ 371 (c)(1),
(2), (4) Date: Feb. 22, 2010

(87) PCT Pub. No.: WO2009/001424
PCT Pub. Date: Dec. 31, 2008

(65) Prior Publication Data
US 2010/0178693 A1  Jul. 15, 2010

(51) Int. Cl.
*B01D 53/34* (2006.01)
*B01D 53/85* (2006.01)

(52) U.S. Cl.
USPC ............ 435/299.1; 435/266; 435/292.1

(58) Field of Classification Search
USPC ..................... 435/266, 292.1, 299.1
See application file for complete search history.

(56) References Cited

U.S. PATENT DOCUMENTS 5,232,586 A * 8/1993 Malone ............. 210/151
5,413,936 A * 5/1995 Rupert ............. 435/298.2

FOREIGN PATENT DOCUMENTS

| EP | 920903 A1 * | 6/1999 |
|---|---|---|
| JP | 06-23389 | 2/1994 |
| JP | 6-254346 | 9/1994 |
| JP | 07-213276 | 8/1995 |
| JP | 07274936 A * | 10/1995 |
| JP | 2004-195423 | 7/2004 |
| JP | 2007-167793 | 7/2007 |

OTHER PUBLICATIONS

English language machine translation of EP 920903A1 (Jun. 1999), 7 pages.*
English language machine translation of JP 07-274936 A (Oct. 1995), 7 pages.*
International Search Report; International Application No. PCT/JP2007/062683; Dated: Sep. 18, 2007.

* cited by examiner

*Primary Examiner* — William H Beisner
(74) *Attorney, Agent, or Firm* — Rader, Fishman & Grauer PLLC

(57) ABSTRACT

A gas cracking apparatus adapted to simultaneously efficiently discharge gas heavier than air and gas lighter than air resulting from assimilations of malodorous gas and greenhouse gas. The main frame of the gas cracking apparatus includes a closed metallic circular tube or angular tube. This tube is provided at its superior portion with a superior vent and provided at its inferior portion with an inferior vent, and the tube is further provided with a gas inlet disposed between the superior vent and the inferior vent.

18 Claims, 14 Drawing Sheets

Fig.2
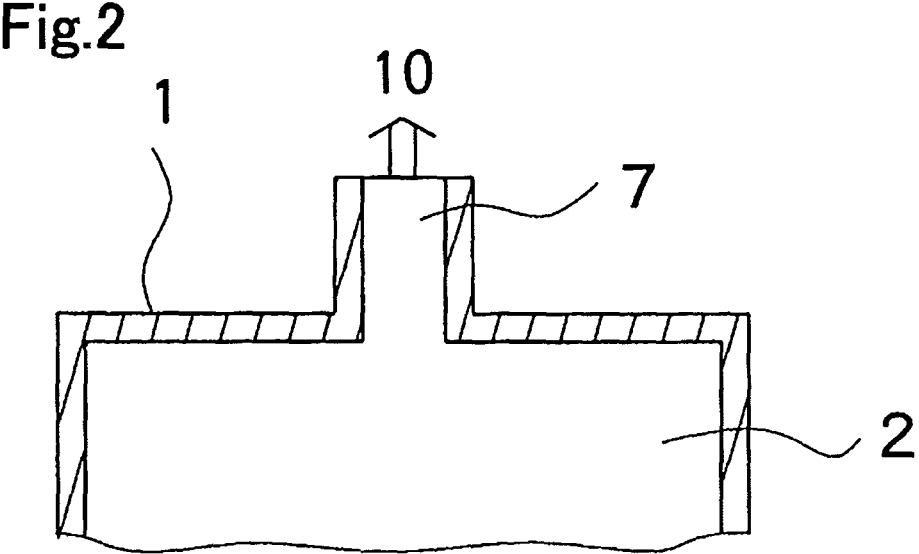
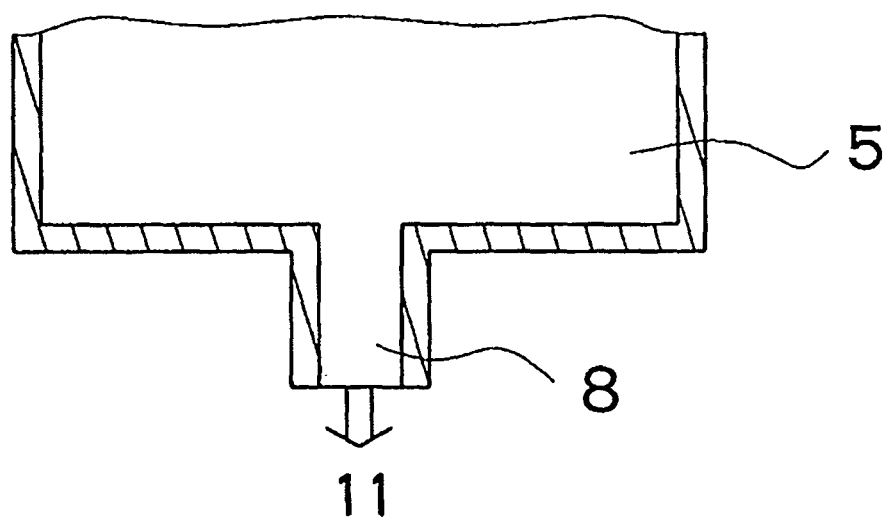

GAS DECOMPOSING APPARATUS

TECHNICAL FIELD

The present invention relates to a gas decomposition apparatus utilizing a carbon dioxide ($CO_2$) fixation mechanism and a biological deodorization mechanism based on photosynthesis bacteria and/or other bacteria and so forth, which is characterized in that combustible gases, which are created when photosynthetic bacteria and/or other bacteria and so forth are grown, propagated and advanced, are discharged in accordance with relative densities thereof, and which is provided with a sprinkler and a light source to facilitate growth, propagation and advance of photosynthetic bacteria and/or other bacteria and so forth, a carbon dioxide ($CO_2$) fixation ability, and a stink gas decomposition ability.

BACKGROUND OF ART

A gas such as a greenhouse gas and a stink gas, which exerts bad influence on an environment, is socially coming up as a serious problem. Conventionally, a biological deodorization method is known as a method for eliminating a stink generated when processing garbage, a stink derived from a food factory and a human waste treatment center, or a stink derived from a honey truck. As main stink components, there are hydrogen sulfide, ammonia, methyl mercaptan and so forth. Also, a greenhouse gas, i.e., six kinds of gas, such as carbon dioxide, methane, dinitrogen monoxide, CFC substitute and so forth, is defined as a gas to be reduced in "Law About Promotion Of Global Warming Measure" established in 1998, and an emission reduction of the greenhouse gas is globally promoted. Nevertheless, conventionally, for example, as a method of eliminating carbon dioxide ($CO_2$) defined as the greenhouse gas, only two method are known: one method is to utilize photosynthesis of plants; and the other method is to lay a liquid containing carbon dioxide under the ground.

As a deodorization apparatus utilizing a biological gas decomposition method, an apparatus utilizing photosynthetic bacteria and/or other bacteria and so forth is a representative. The deodorization apparatus utilizing the photosynthetic bacteria has an arrangement wherein a bacteria bed material layer is formed of porous substances, bamboo charcoal substances and/or leaf mold substances and so forth, to which the photosynthetic bacteria activated by lights are adhered, and wherein either a greenhouse gas or a stink gas is made to pass through the bacteria bed material layer under a condition that the bacteria bed material layer is sufficiently illuminated with lights, to thereby eliminate either the greenhouse gas or the stink gas (see: Patent Document 1).

On the other hand, a gas decomposition apparatus utilizing bacteria has an arrangement wherein a bacteria bed material layer is formed of porous substances, bamboo charcoal substances and/or leaf mold substances and so forth, to which the bacteria are adhered, and wherein a gas containing either a greenhouse gas or a stink gas is made to pass through the bacteria bed material layer while feeding a nutrition solution to the bacteria bed material layer, to thereby eliminate the greenhouse gas or the stink gas. In every one of the aforesaid apparatuses, a hydrogen gas lighter than the air and a butane gas heavier than the air are created. Every one of the hydrogen gas and the butane gas is combustible.

Also, for example, as a biological greenhouse gas fixation/elimination apparatus utilizing a biological gas decomposition method, there is the one disclosed in JP-2000-032004 A. This conventional technique is depicted in FIG. 13 in a schematic cross-sectional view. The conventional gas decomposition apparatus comprises a substrate 101a having a recess formed in an upper surface thereof, a schizophycean-culturing-layer feeding pipe (photosynthetic-microorganism-culturing-layer feeding means) 101b for feeding a schizophycean-culturing-layer to the aforesaid recess, a schizophycean-culturing-layer exhausting pipe 101c opening at a bottom of the aforesaid recess, and a schizophycean-culturing-layer exhausting valve 101d for regulating a flow rate of the schizophycean-culturing-layer discharged from the schizophycean-culturing-layer exhausting pipe 101c, and is constituted as a construction-purpose cladding panel (roof cladding panel) having a carbon dioxide decomposition function (see: Patent Document 2).

Further, for example, there is the one disclosed in JP2001-062248 A. This conventional technique is depicted in FIG. 14 in a schematic cross-sectional view. The conventional gas decomposition apparatus has an arrangement wherein an exhaust-gas pH regulating means 214 for regulating a pH of an exhaust gas to fall in the range from pH5 to pH9 which microorganisms like, wherein an exhaust-gas temperature regulating means 216 for regulating a temperature of the exhaust gas to fall in the range from 40° C. to 50° C. which the microorganisms like, are provided in an exhaust-gas introduction pipe 218 in the vicinity of an introduction port 213 thereof, and wherein an organism treatment reaction means is provided in each of decomposition tanks 201 constructed in an exhaust-gas discharging side of the exhaust-gas introduction pipe 218, with the decomposition tanks 201 being arranged side by side in a given number. The exhaust-gas introduction pipe 218 branches so as to be connected to respective exhaust-gas spraying main pipes 220 passing through the decomposition tanks 201, with the exhaust-gas spraying main pipes 220 having exhaust-gas spraying branch pipes 221 in the respective decomposition tanks 201. In each of the decomposition tanks 201, air-injection pipes 224 are provided so as to be longitudinally extended to the bottom of the decomposition tank 201. The exhaust gas is sprayed in a synthetic soil of the organism treatment reaction means provided in each of the decomposition tanks 201, so that contamination substances are absorbed by the organism treatment reaction means. Then, the contamination substances thus absorbed are subjected to a decomposition treatment with the microorganisms.

Patent Document 1: JP-2004-195423 A
Patent Document 2: JP2000-320041 A
Patent Document 3: JP2001-062248 A

DISCLOSURE OF THE INVENTION

Problems to be Resolved by the Invention

However, in every one of the aforesaid conventional gas decomposition apparatus, a single gas exhaust port is merely provided for a processed gas, and thus it is impossible to efficiently discharge a hydrogen gas lighter than the air and a butane gas heavier than the air. The present invention has been created to resolve the aforesaid conventional problem and an object of the present invention is to provide a gas decomposition apparatus which is able to simultaneously and efficiently discharge efficiently a gas lighter than the air and a gas heavier than the air which result from assimilation of a greenhouse gas and a stink gas. Also, it is not possible to reduce an emission of carbon dioxide gas ($CO_2$) defined as the greenhouse gas, which is gradually increased every year, because there is only a carbon dioxide gas ($CO_2$) fixation/elimination utilizing photosynthesis of plants.

Means for Solving the Problems

In order to resolve the aforesaid problems, the comprises a tubular gas decomposition apparatus body in which a bacteria bed material layer containing bacteria selecting and decomposing a specific gas component is received, and into which a gas to be subjected to a decomposition processing, containing said specific gas component, is introduced from a gas introduction port thereof, and is characterized by the fact that an upper exhaust port is provided in an upper section of said gas decomposition apparatus body, and that a lower exhaust port is provided in an lower section of said gas decomposition apparatus body.

In the gas decomposition apparatus, the invention is characterized by the fact that said specific gas component is either a greenhouse gas or a stink gas. In the gas decomposition apparatus, the invention is characterized by the fact that said gas introduction port is provided in a middle location between said upper exhaust port and said lower exhaust port.

In the gas decomposition apparatus, the invention is characterized by the fact that said bacteria bed material layer comprises an upper bacteria bed material layer provided between said gas introduction port and said upper exhaust port, and a lower bacteria bed material provided between said gas introduction port and said lower exhaust port.

In the gas decomposition apparatus, the invention is characterized by the fact that said upper bacteria bed material layer or said lower bacteria bed material layer is composed of a plurality of bacteria bed material layer units which are stacked in order, and which are arranged in such a manner that a number of said units is able to be regulated.

In the gas decomposition apparatus, the invention is characterized by the fact that at least one of said gas introduction port, said upper exhaust port and said lower exhaust port is provided with a fan.

In the gas decomposition apparatus, the invention is characterized by the fact that said gas decomposition apparatus body comprises a plurality of dividable segments which are connected to each other, and that said bacteria bed material layer is received as a detachable unit in an interior of said gas decomposition apparatus body.

In the gas decomposition apparatus, the invention is characterized by the fact that said gas introduction port is provided with a backward-flow prevention device for preventing a backward flow of the gas to be subjected to the decomposition processing from said gas decomposition apparatus to said gas introduction port.

In the gas decomposition apparatus, the invention is characterized by the fact that said backward-flow prevention device includes a tank, an upper section of which is in communication with said gas decomposition apparatus body, and a lower section of which charged with a liquid, and a porous gas ejector which is provided in the lower section of said tank, and to which the gas to be subjected to the decomposition processing is fed.

In the gas decomposition apparatus, the invention is characterized by the fact that said backward-flow prevention device is a check valve which is provided in said gas introduction port, and which is opened in only a direction from an upstream side of the gas to be subjected to the decomposition processing toward a downstream side thereof.

In the gas decomposition apparatus, the invention is characterized by the fact that a sprinkler is provided in the upper section of said gas decomposition apparatus body, and is connected to either a tank, in which a liquid containing photosynthetic bacteria and/or other bacteria and so forth is held, or a water pipe for feeding a water.

In the gas decomposition apparatus, the invention is characterized by the fact that a light source is provided above said bacteria bed material in said gas decomposition apparatus body.

In the gas decomposition apparatus, the invention is characterized by the fact that a light source is provided on a side wall face of said gas decomposition apparatus body, so that a top, sides and an interior of said bacteria bed material layer are illuminated with said light source in said gas decomposition apparatus body.

In the gas decomposition apparatus, the invention is characterized by the fact that said gas decomposition apparatus body is formed so as to be horizontally extended, that said gas introduction port being placed at a central location in a longitudinal direction of said gas decomposition apparatus body, that the upper exhaust port and the lower exhaust port are respectively placed at upper and lower sides of each end of said gas decomposition apparatus body, and that the bacteria bed material layers are provided between said gas introduction port and the upper and lower exhaust ports at one end side and between said gas introduction port and the upper and lower exhaust ports at the other end side, respectively.

In the gas decomposition apparatus, the invention is characterized by the fact that two divided chambers are defined in the lower section of said gas decomposition apparatus body by a partition, that said gas introduction port is placed at one of said two divided chambers, that said lower exhaust port is formed in the other divided chamber, that said bacteria bed material layer is placed between the upper section of said gas decomposition apparatus body and the one of said two divided chambers, and that said upper exhaust port is placed at the upper section of said gas decomposition apparatus body.

In the gas decomposition apparatus, the invention is characterized by the fact that said bacteria for eliminating a greenhouse gas or decomposing a stink gas comprise photosynthetic bacteria.

In the gas decomposition apparatus, the invention is characterized by the fact that said bacteria for eliminating a greenhouse gas or decomposing a stink gas comprise chemoautotrophic bacteria.

In the gas decomposition apparatus, the invention is characterized by the fact that said bacteria for eliminating a greenhouse gas or decomposing a stink gas comprise mixed-cultured bacteria containing photosynthetic bacteria, chemomixotrophic bacteria and chemoautotorophic bacteria.

In the gas decomposition apparatus, the invention is characterized by the fact that said bacteria bed material layer contains not only a nutrition substance but also a kind of lactic acid bacteria or more than one kindnof lactic acid bacteria, such as *lactobacillus acidophilus, lactobacillus plantarum, lactobacillus brevis, lactobacillus salivarius, lactobacillus pentose, lactobacillus reuteri, lactobacillus casei* and so forth.

Effect of the Invention

According to the inventions, it is possible to efficiently and simultaneously discharge a gas lighter than the air and a gas heavier than the air, which result from assimilation of a greenhouse gas and a stink gas. Also, it is possible to efficiently and simultaneously discharge a combustible gas lighter than the air and a combustible gas heavier than the air which are created by a variety of bacteria when a greenhouse gas and a stink gas are taken in the bacteria as a carbon source for creating cells of the bacteria, and a gas lighter than the air and a gas heavier than the air which may be created by activity of various kinds of bacteria when the various kinds of bacteria floating in the art are adhered to bacteria bed material layers or when the various kinds of bacteria are adhered to the bacteria bed material layers during handling of the bacteria bed material layers. Also, by mixing and culturing chemoautotrophic bacteria and chemoautotorophic bacteria in addition to photosynthetic bacteria, it is possible to more enhance an ability of gas decomposition in comparison of a case where only the photosynthetic bacteria is used. Also, when rock candy or solid milk for nutrition is added together with lactic acid bacteria to photosynthetic bacteria, the rock candy or the solid milk are changed into lactic acid due to a reaction based, so that it is possible to efficiently nourish the photosynthetic bacteria. Further, when photosynthetic bacteria coexist with substrates, featuring a low oxidation level, such as lactic acid, i.e., when there is an excess deoxidization force, a non-cyclic electron transport system is operated so that it is possible to obtain an advantage that a fixation reaction of carbon dioxide ($CO_2$) can be considerably facilitated (about three times), resulting in exercise of a high gas decomposition ability.

BRIEF EXPLANATIONS OF DRAWINGS

FIG. 2 are cross-sectional views showing respective modifications of the upper exhaust port and the lower exhaust port, respectively.

EXPLANATION OF REFERENCES

Figure 1:
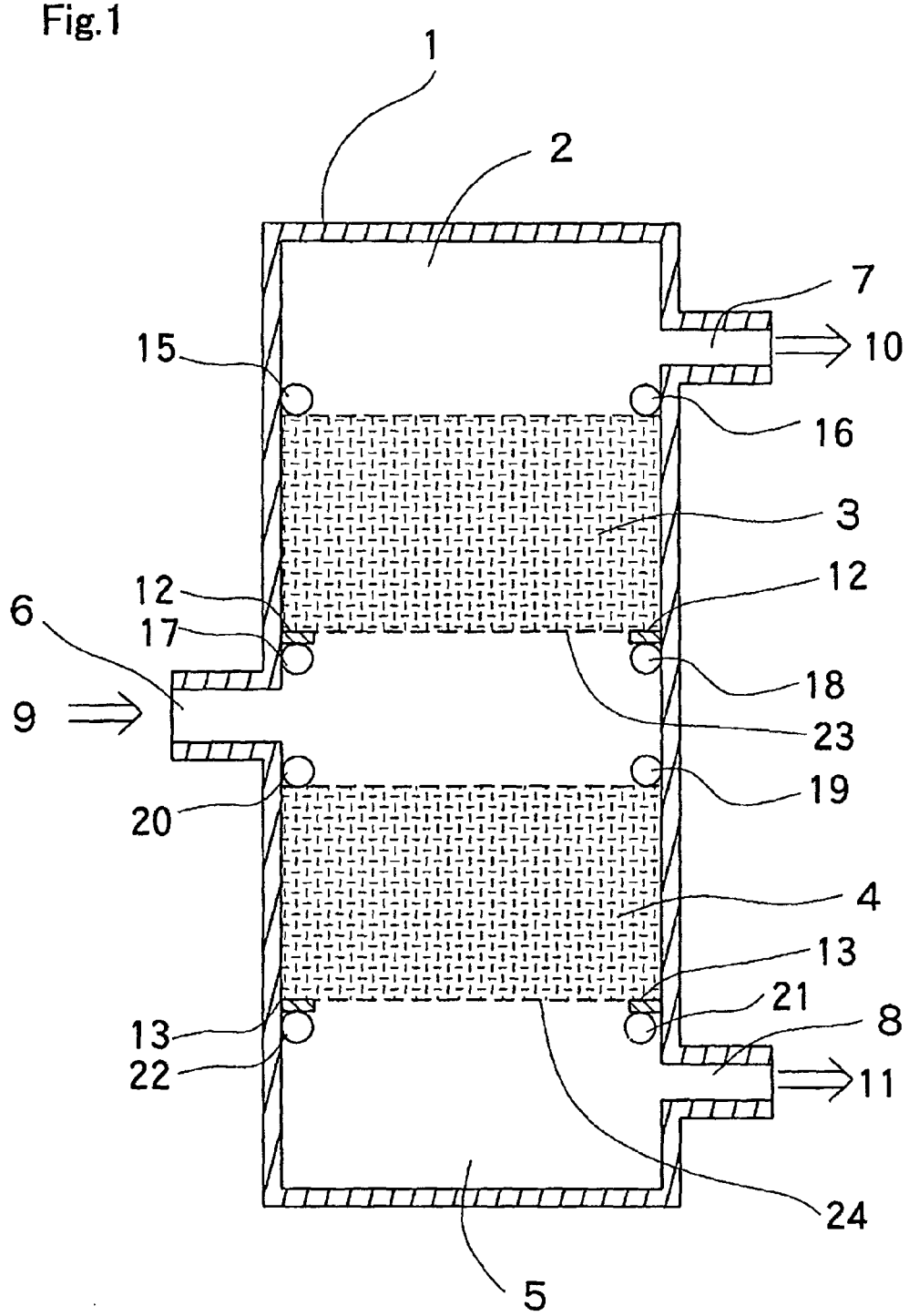
FIG. 1 is a cross-sectional view of a first embodiment of the present invention.

1 Gas Decomposition Apparatus Body
2 Upper Exhaust Chamber
3 Upper Bacteria Bed Material Layer
4 Lower Bacteria Bed Material Layer
5 Lower Exhaust Chamber
6 Gas Introduction Port
7 Upper Exhaust Port
8 Lower Exhaust Port
9 Stink Gas (or Greenhouse Gas)
10 Hydrogen Gas
11 Butane Gas
12, 13 Supporter
15-22 Light Source
23, 24 Mesh Member
25 Water Reservoir
26-28 Fans
29 Bacteria Bed Material Layer Unit
30 Fastening Portion
31 Bacteria Bed Material Layer Unit
32 Fastening Portion
33 Connecting Portion
34 Connecting Portion
35, 36 Fastener
37 Bacteria Bed Material Layer
38 Exhaust Chamber
39 Bacteria Bed Material Layer
40-42 Exhaust Chamber
43 Deodorant Layer
44, 45 Inflow Chamber
46 Backward-Flow Prevention Filter
47 Culture Solution
48 Exhaust Chamber
49 Pump
50 Feeding Pipe
51 Porous Gas Ejector
52 Check Valve
53 Solution Tank
54 Culture Solution
55 Feeding Pipe
56 Sprinkler
57 Sprinkled Water
58 Partition
59 Warm Layer
60 Pump

THE BEST MODE FOR EMBODYING THE INVENTION

First Embodiment

A first embodiment of the present invention is depicted in FIGS. 1 to 5. As shown in these drawings, a greenhouse gas fixation/elimination apparatus body 1 is a closed cylindrical or rectangular metallic tube, and has an upper exhaust port 7 provided in an upper section thereof, a lower exhaust port 8 provided in a lower section thereof, and a gas introduction port 6 provided between the upper exhaust port 7 and the lower exhaust port 8.

In the interior of the greenhouse gas fixation/elimination apparatus body 1, an upper bacteria bed material layer 3 is received, and is supported by a supporter 12, with an upper exhaust chamber 2 being defined in the upper section thereof, and a lower bacteria bed material layer 4 is received therein, and is supported by a supporter 13, with a lower exhaust chamber 5 being defined in the lower section thereof. The upper exhaust chamber 2 is in communication with the upper exhaust port 7, and the lower exhaust chamber 5 is in communication with an exhaust gas 11.

The upper bacteria bed material layer 3 is composed of a greenhouse gas decomposition material which is supported by a gas-passable mesh member 23 placed on the lower surface thereof, with the greenhouse gas decomposition material containing porous substances, bamboo charcoal substances and/or leaf mold substances and so forth, to which photosynthetic bacteria are adhered. For the photo-synthetic bacteria, purple non-sulfur bacteria, purple sulfur bacteria, green sulfur bacteria and/or gliding filamentous green sulfur bacteria and so forth.

Reaction formulas regarding photosynthesis of these photo-synthetic bacteria are shown below.

(Reactions in which Purple or Green Sulfur Bacteria is Concerned)

$$CO_2+2H_2S+(Lights) \rightarrow CH_2O+H_2O+2S \tag{1}$$

$$S+CO_2+3H_2O+(Lights) \rightarrow CH_2O+H_2SO_4+H_2\uparrow \tag{2}$$

$$2CO_2+NaS_2O_3+3H_2O+(Lights) \rightarrow 2\{CH_2O\}+NaS_2O_4+H_2SO_4 \tag{3}$$

(Reactions in which Purple Non-Sulfur Bacteria is Concerned)

$$CO_2+2H_2Accepter+(Lights) \rightarrow \{CH_2O\}+H_2O+2Acceptror \tag{4}$$

$$C_4H_7O_2Na+2H_2O+2CO_2+(Lights) \rightarrow 5\{CH_2O\}+NaHC_3 \tag{5}$$

$$C_4H_6O_2+H_2O+(Lights) \rightarrow \{CH_2O\}_2+2CO_2+2H_2\uparrow \tag{6}$$

Similarly, the lower bacteria bed material layer 4 is composed of a greenhouse gas decomposition material which is supported by a gas-passable mesh member 24 placed on the lower surface thereof, with the greenhouse gas decomposition material containing porous substances, bamboo charcoal substances and/or leaf mold substances and so forth, to which photosynthetic bacteria are adhered (for example, to which a liquid or a fluid in which the photosynthetic bacteria are cultured is adhered). The greenhouse gas decomposition material is similar to that of the upper bacteria bed material layer 3. Light sources 15-22 are arranged at predetermined locations in the greenhouse gas fixation/elimination apparatus body 1. The light sources 15-22 are provided to illuminate the photo-activated photosynthetic bacteria with a sufficient amount of light.

Figure 3:
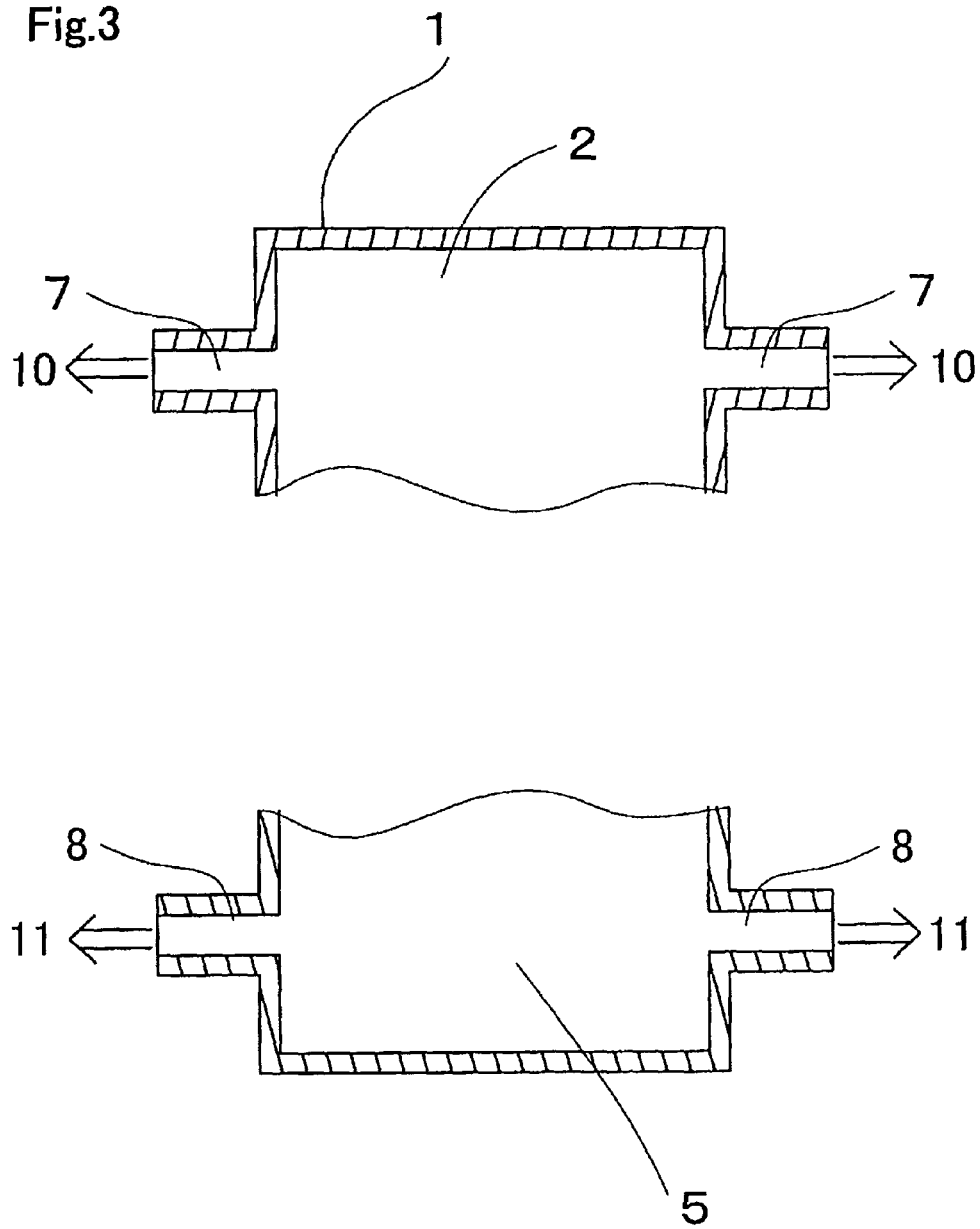
FIG. 3 are cross-sectional views showing other modifications of the upper exhaust port and the lower exhaust port, respectively.

Note, as shown in FIG. 2, the upper exhaust port 7 may be oriented upward, and the lower exhaust port 8 may be oriented downward. Also, as shown in FIG. 3, for example, two upper exhaust ports 7 may respectively be provided at two locations so as to be oppositely directed to each other. Similarly, two lower exhaust ports 8 may be respectively provided at two locations so as to be oppositely directed to each other. Further, although the upper bacteria bed material layer 3 and/or the lower bacteria bed material layer 4 are explained as the one to which the photosynthetic bacteria are adhered, the upper bacteria bed material layer 3 may be formed as a bacteria bed material layer using the photosynthetic bacteria, whereas the lower bacteria bed material layer 4 may be as a bacteria bed material layer using other bacteria, and vice versa. For the other bacteria, chemoautotrophic bacteria, chemo-mixotrophic bacteria, chemoautotorophic bacteria and so forth may be used. Also, these bacteria may be mixed with the photosynthetic bacteria, with the mixed bacteria being added to the bacteria bed material. Further, the bacteria may be adhered together with lactic acid bacteria to the bacteria bed material, using rock candy or solid milk for nutrition.

Figure 4:
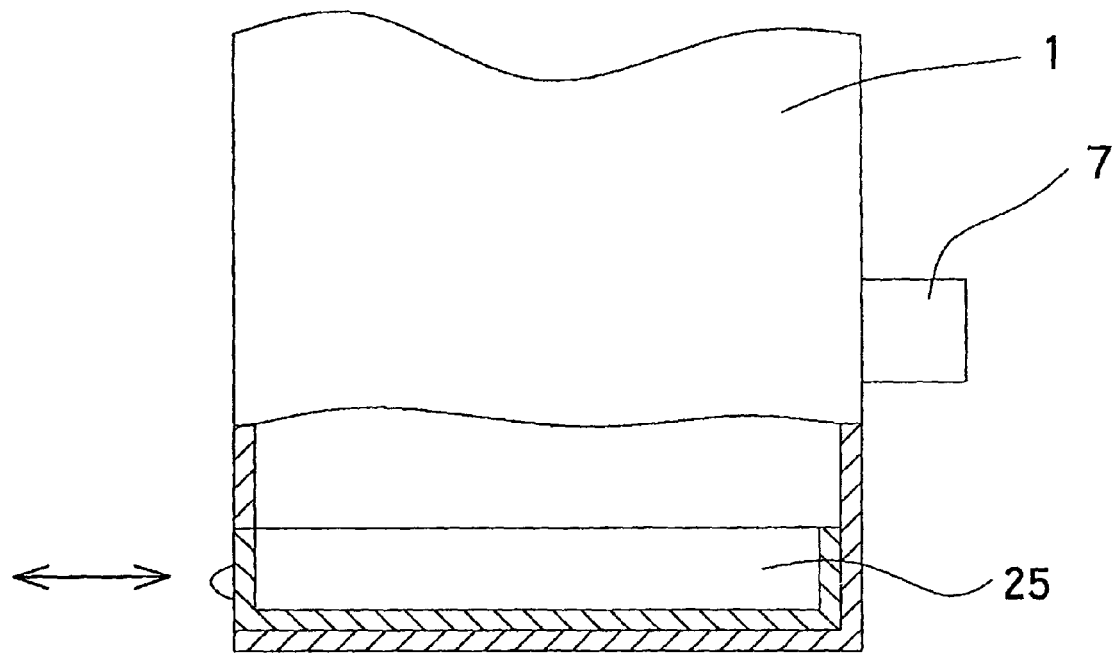
FIG. 4 is a cross-sectional view showing an example of a water reservoir.

FIG. 4 shows an example in which a water reservoir 25 is provided in the bottom of the greenhouse gas fixation/elimination apparatus body 1. In short, when a culture liquid, in which the photosynthetic bacteria and other bacteria are cultured, is fed to the upper bacteria bed material layer 3 and/or the lower bacteria bed material layer 4, it is necessary to receive moisture dropping therefrom. In the example shown in FIG. 4, the water reservoir 25 is formed as a drawer which is movable in directions indicated by an arrow. With this arrangement, it is possible to properly remove the moisture.

Figure 5:
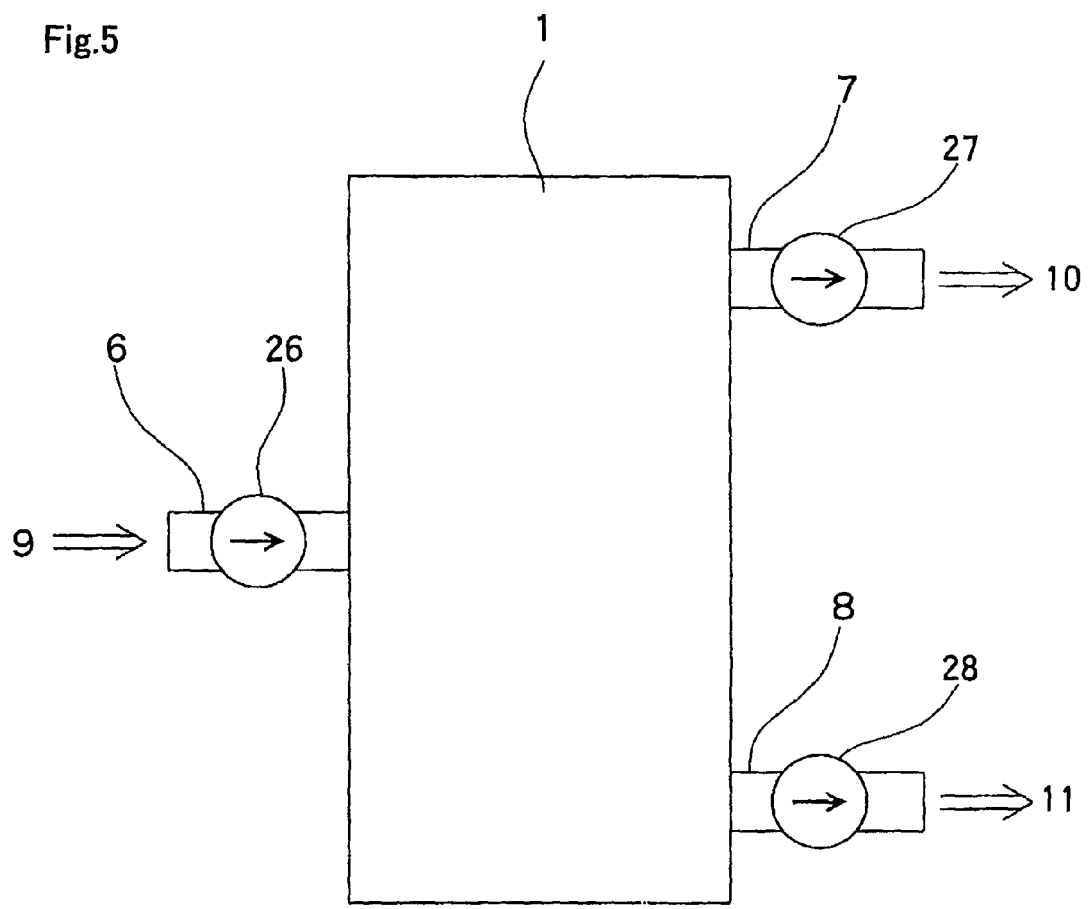
FIG. 5 is a cross-sectional view showing an example in which fans are provided.

FIG. 5 shows an example in which the gas introduction port 6, the upper exhaust port 7 and the lower exhaust port 8 are provided with respective fans 26, 27 and 28 so that a greenhouse gas 9 is forcibly introduced and discharged. With this arrangement, the greenhouse gas 9 can smoothly flow into the greenhouse gas fixation/elimination apparatus body 1 against a flowing resistance provided therein, resulting in facilitation in an elimination rate of the greenhouse gas.

With the arrangement as mentioned above, under the condition that the light sources 15-22 are turned on, when the greenhouse gas 9 is introduced from the gas introduction port 7 into the greenhouse gas fixation/elimination apparatus body, and when it passes through the upper bacteria bed material layer 3 and the lower bacteria bed layer 4, carbon dioxide ($CO_2$) in the greenhouse gas is taken therein as a carbon source for creating cells of the bacteria so that the fixation and elimination of carbon can be carried out. Also, due to the fact that the photosynthetic bacteria, the chemoautotrophic bacteria, the chemo-mixotrophic bacteria and the chemoautotorophic bacteriais are adhered to the bacteria bed material layers, a creation of both a combustible hydrogen gas lighter than the air and a combustible butane gas heavier than the air, is accompanied by the fixation and elimination of the greenhouse gas. At this time, the hydrogen gas 10 lighter than the air is discharged from the upper exhaust port 7 through the upper exhaust chamber 2, and the butane gas 11 heavier than the air is discharged from the lower exhaust port 8 through the lower exhaust chamber 5.

As stated above, it is possible to simultaneously discharge both the hydrogen gas 10 lighter than the air and the butane gas 11 heavier than the air. Accordingly, the combustible gases can be prevented from staying in the greenhouse gas fixation/elimination apparatus body 1, resulting in contribution to improvement in safety.

Second Embodiment

Figure 6:
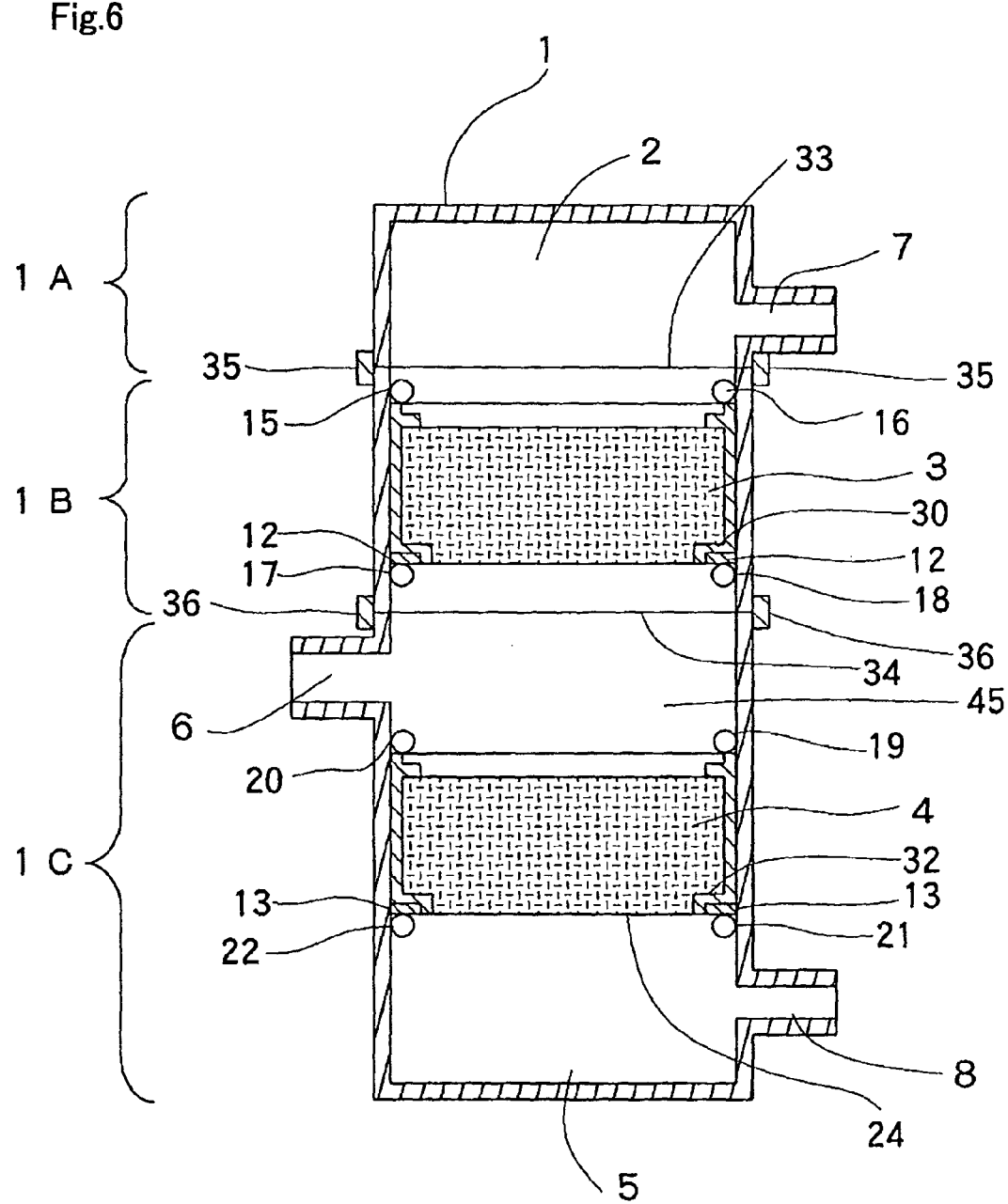
FIG. 6 is a cross-sectional view of a second embodiment of the present invention.

A second embodiment of the present invention is depicted in FIG. 6. In this embodiment, a greenhouse gas fixation/elimination apparatus body 1 is able to be divided in its axial direction into a plurality of segments, and each of an upper bacteria bed material layer 3 and a lower bacteria bed material layer 4 is formed as a detachable unit. Note that, in this second embodiment, the same elements as or similar elements to those of the first embodiment (FIGS. 1-5) are indicated by the same references, and that the particular explanations of these elements are omitted.

As shown in FIG. 6, the greenhouse gas fixation/elimination apparatus body 1 is composed of an upper unit 1A, an intermediate unit 1B and a lower unit 1C, and these units are connected and fixed at connecting portions 33 and 34 to each other by fasteners 35 and 36, respectively.

Note that the upper unit 1A, the intermediate unit 1B and the lower unit 1C may be threadedly engaged with each other by forming both a male thread and a female thread (not shown) in ends of units to be connected.

With this arrangement, it is possible to easily carry out the maintenance in which an exchange of the upper bacteria bed material layer 3 and the lower bacteria bed material layer 4, a supply of the photosynthetic bacteria, an exchange of the photosynthetic bacteria, and so forth are included.

Third Embodiment

Figure 7:
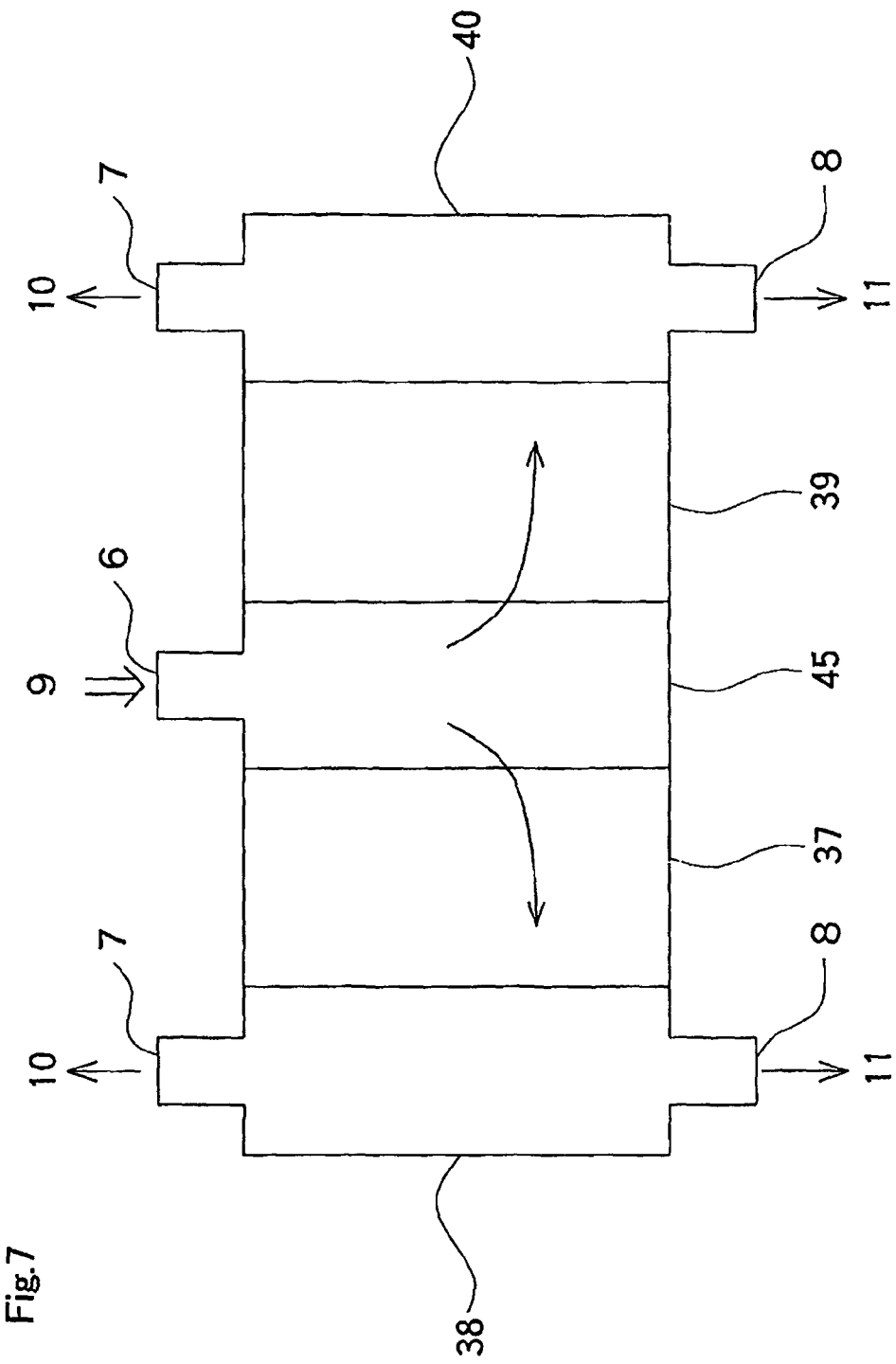
FIG. 7 is a cross-sectional view of a third embodiment of the present invention.

A third embodiment of the present invention is depicted in FIG. 7. In this embodiment, a greenhouse gas fixation/elimination apparatus body 1 is configured as a laterally-extended one, and is installed horizontally (laterally), and a gas introduction port 6 is arranged to direct the flow to right and left. Note that, in this third embodiment, the same elements as or similar elements to those of the first embodiment (FIGS. 1-5) are indicated by the same references, and that the particular explanations of these elements are omitted.

As shown in FIG. 7, upper exhaust ports 7 and lower exhaust ports 8 are provided at the right and left sides of the horizontally-installed greenhouse gas fixation/elimination apparatus body 1 in the longitudinal direction thereof, and the gas introduction port 6 is provided at a center location in the longitudinal direction. Bacteria bed material layers 37 and 39 are placed between the gas introduction port 6 and the respective upper and lower exhaust ports 7 and 8. Similar to the upper bacteria bed material layer 3 or the lower bacteria bed material layer 4 (see: FIG. 1), for the bacteria bed material layers 37 and 39, a greenhouse gas decomposition material containing porous substances, bamboo charcoal substances and/or leaf mold substances and so forth, to which photosynthetic bacteria (or a combination of the same with other bacteria) are adhered, is used. Also, although light sources for activating the photosynthetic bacteria are not illustrated, they are provided in the interior of the greenhouse gas fixation/elimination apparatus body 1.

With the arrangement as mentioned above, a greenhouse gas 9 ($CO_2$) is introduced from the gas introduction port 6 into an inflow chamber 45, and is fixed and eliminated when it passes through the bacteria bed material layers 37 and 39 by the photosynthetic bacteria. At this time, a created hydrogen gas 10 lighter than the air is discharged from the upper exhaust ports 7, and a created butane gas 11 heavier than the air is discharged from the lower exhaust ports 8.

With this arrangement, an application of the present invention is made possible even if an installation location is specified, and thus not only can the hydrogen gas 10 lighter than the air be discharged, but also the butane gas 11 heavier than the air is simultaneously discharged.

Fourth Embodiment

Figure 8:
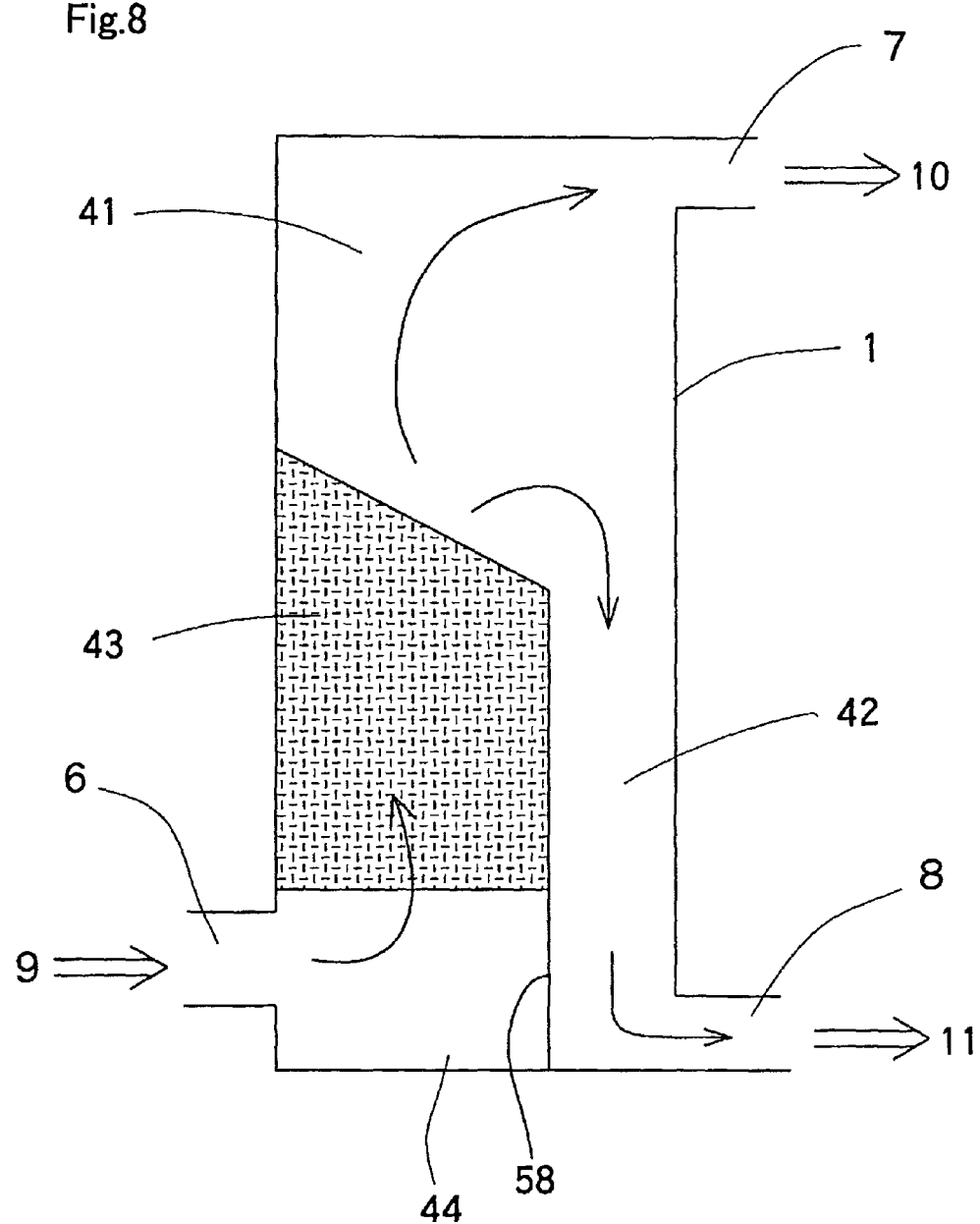
FIG. 8 is a cross-sectional view of a fourth embodiment of the present invention.

A fourth embodiment of the present invention is depicted in FIG. 8. This embodiment includes a single deodorant layer 43 (i.e., a bacteria bed material layer in the aforesaid first, second and third embodiments), and is aimed at deodorizing a stink gas. Herein: the term "single" means that the deodorant layer 43 per se is formed as an integrated unit, and thus an interior of the deodorant layer may be composed of a plurality of layers. Note that, in this fourth embodiment, the same elements as or similar elements to those of the first embodiment (FIGS. 1-5) are indicated by the same references, and that the particular explanations of these elements are omitted.

As shown in FIG. 8, in a lower section of a deodorization apparatus body 1, two divided chambers (an inflow chamber 44 and an exhaust chamber 42) are defined by a partition 58. A gas introduction port 6 is provided so as to be in communication with the inflow chamber 44 defining one of the divided chambers, and a lower exhaust port 8 is provided so as to be in communication with the exhaust chamber 44 defining the other divided chamber. The deodorant layer 43 is provided between an exhaust chamber 41, defined in an upper section of the deodorization apparatus body 1, and the exhaust chamber 44, with an upper exhaust port 7 being provided in the upper section of the deodorization apparatus body 1. Also, although light sources for activating the photosynthetic bacteria are not illustrated, they are provided in the interior of the deodorization apparatus body 1.

A stink gas 9 introduced from the gas introduction port 6 flows into the exhaust chamber 41 through the intermediary of the deodorant layer 43, so that a hydrogen gas 10 lighter than the air is discharged from the upper exhaust port 7, and so that a butane gas 11 heavier than the air is discharged from the lower exhaust port 8 through the exhaust chamber 42. As stated above, by using the single deodorant layer 43, the deodorization apparatus can be downsized. As a result, since it is possible to invert the deodorization apparatus with portability, application of the deodorization apparatus can be widened. For example, a mobile vehicle such as a honey truck and so forth can carry the deodorization apparatus.

Fifth Embodiment

Figure 9:
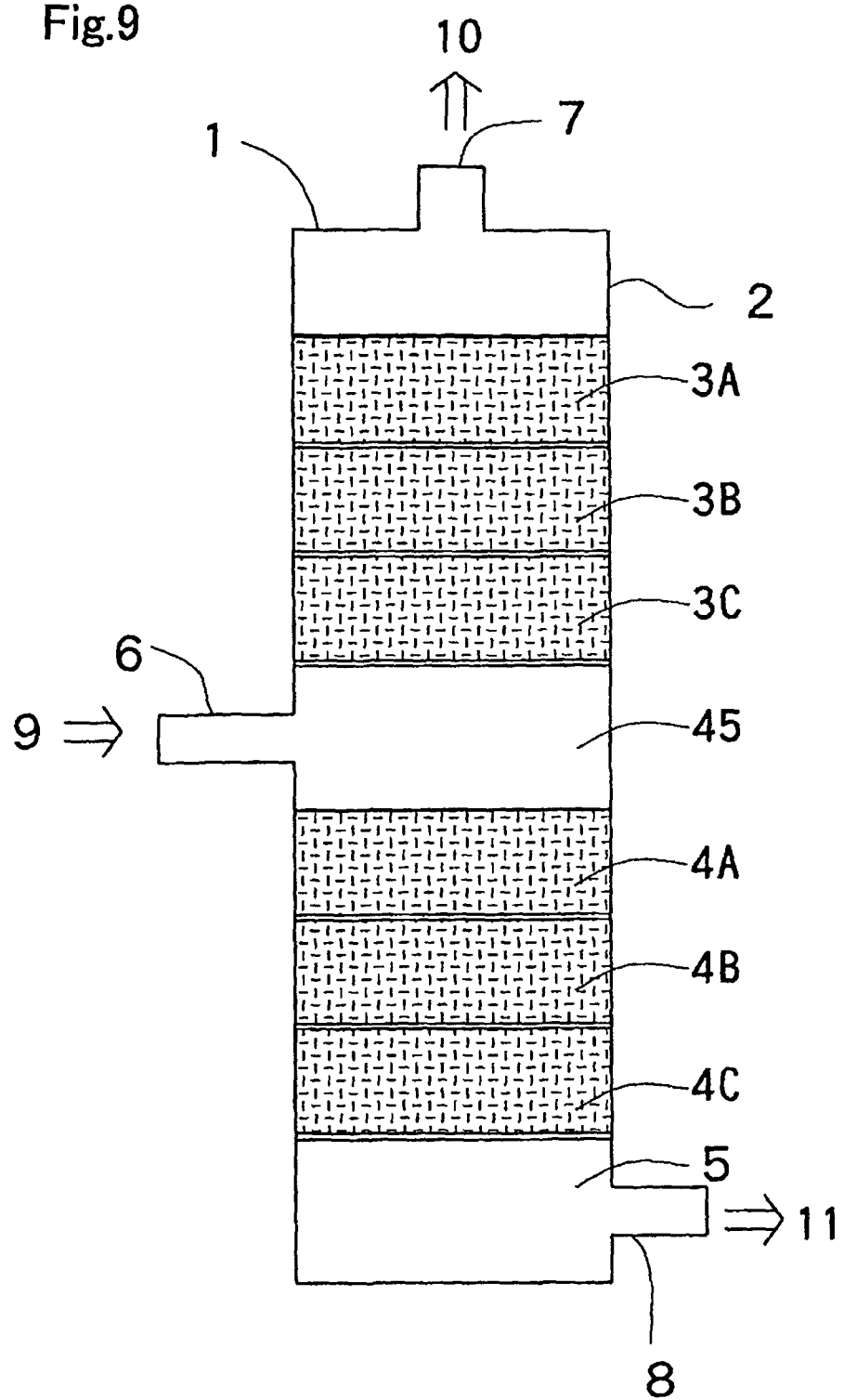
FIG. 9 is a cross-sectional view of a fifth embodiment of the present invention.

A fifth embodiment of the present invention is depicted in FIG. 9. In this embodiment, a bacteria bed material layer is composed of a plurality of layers. Note that, in this fifth embodiment, the same elements as or similar elements to those of the first embodiment (FIGS. 1-5) are indicated by the same references, and that the particular explanations of these elements are omitted. In particular, as shown in FIG. 9, an upper bacteria bed material layer 3 received in a gas decomposition apparatus body 1 is composed of a plurality of bacteria bed material layers 3A, 3B and 3C, and also a lower bacteria bed material layer 3 is composed of a plurality of bacteria bed material layers 4A, 4B and 4C.

Figure 10:
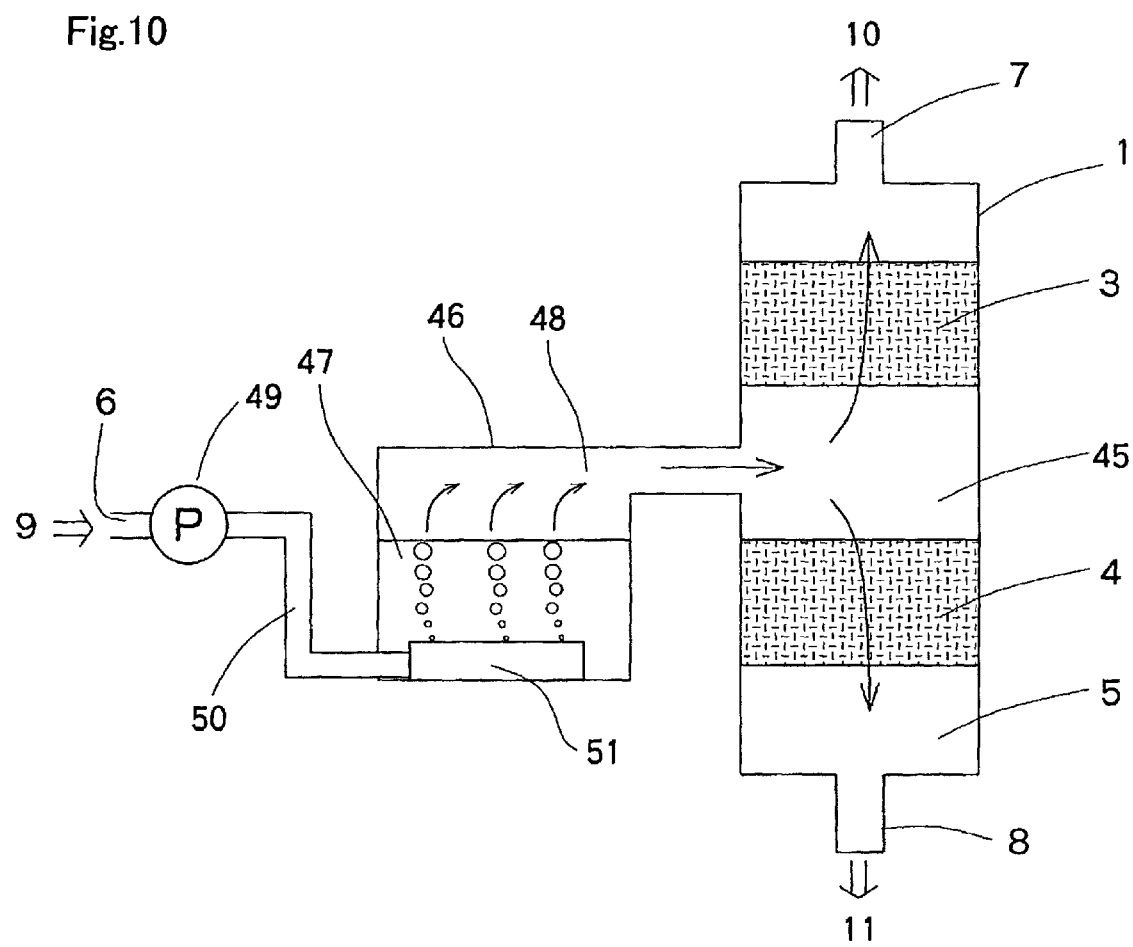
FIG. 10 is a cross-sectional view of a sixth embodiment of the present invention.

In the plurality of bacteria bed material layers 3A, 3B and 3C, for example, the bacteria bed material layers 3A and 3B may be formed as a photosynthetic-bacteria adhesion layer, and the bacteria bed material layer 3C may be formed as a mixed-bacteria adhesion layer including a combination of a photosynthetic bacteria with other bacteria. Furthermore, the number of bacteria bed material layers may be regulated so as to be increased or decreased in accordance with a degree of a concentration of a greenhouse gas 9. Note that, although light sources for activating the photosynthetic bacteria are not illustrated, they are provided in the interior of the greenhouse gas fixation/elimination apparatus body 1. In this embodiment, it is possible to vary a combination of the bacterial bed material layers in accordance with degrees of a concentration and an emission of the greenhouse gas 9, so that the apparatus can be constructed in a variety of sizes Sixth Embodiment A sixth embodiment of the present invention is depicted in FIG. 10. In this embodiment, not only can a backward flow of a greenhouse gas 9 from a greenhouse gas fixation/elimination apparatus body 1 to a gas introduction port 6 be prevented, but also the greenhouse gas 9 can be subjected to a preparatory elimination processing prior to the introduction of the greenhouse gas 9 into the greenhouse gas fixation/elimination apparatus body 1. Note that, in this fifth embodiment, the same elements as or similar elements to those of the first embodiment (FIGS. 1-5) are indicated by the same references, and that the particular explanations of these elements are omitted.

As shown in FIG. 10, the gas introduction port 6 is connected to the greenhouse gas fixation/elimination apparatus body 1 through the intermediary of a backward-flow prevention filter 46. The backward-flow prevention filter 46 is a water tank which is charged with a culture solution 47 containing photosynthetic bacteria and/or other bacteria and so forth. A porous gas ejector is placed on a bottom of the backward-flow prevention filter 46, and, when the greenhouse gas 9, forcibly fed by a pump 9, passes through the culture solution 47, it is preparatorily subjected to a greenhouse gas fixation/elimination processing. 50 indicates a feeding pipe. Other elements are similar to those of the first embodiment (FIGS. 1-5).

With the arrangement as mentioned above, the greenhouse gas 9 introduced from the gas introduction port 6 is forcibly fed to the porous gas ejector through the feeding pipe 50 by the pump 49. The fed greenhouse gas 9 is ejected as bubbles from the porous gas ejector so as to pass through the culture solution 47, and then is fed to an inflow chamber 45 of the greenhouse gas fixation/elimination apparatus body 1 through an exhaust chamber 48. At this time, the greenhouse gas in the inflow chamber 45 is isolated from the gas introduction port 6 by the culture solution 47, and the backward flow the greenhouse gas toward the gas introduction port 6 is prevented due to the forcible blow of the pump 49.

As stated above, according to this embodiment, it is possible to realize the preparatory elimination processing and the prevention of the backward flow of the greenhouse gas 9.

Seventh Embodiment

Figure 11:
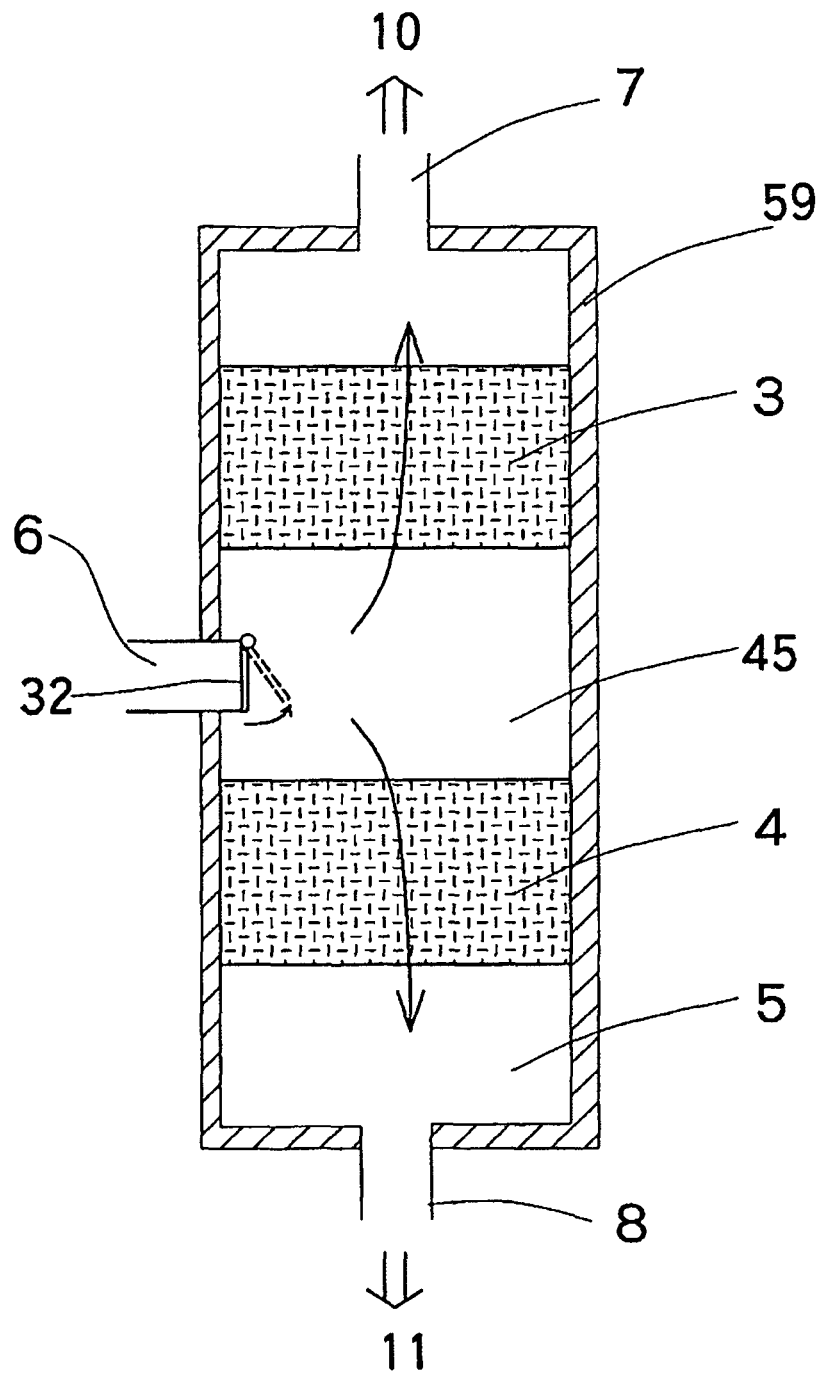
FIG. 11 is a cross-sectional view of a seventh embodiment of the present invention.

A seventh embodiment of the present invention is depicted in FIG. 11. In this embodiment, photosynthetic bacteria and/or other bacteria and so forth in bacteria bed material layers are put under an optimally-thermal environment to thereby activate them, resulting in improvement in greenhouse gas decomposition efficiency. Note that, in this seventh embodiment, the same elements as or similar elements to those of the first embodiment (FIGS. 1-5) are indicated by the same references, and that the particular explanations of these elements are omitted. As shown in FIG. 11, a warm layer 59 is provided on an outer wall of a greenhouse gas fixation/elimination apparatus body 1.

For the warm layer 59, a thermal insulator material may be used, or a heater, which is thermally controlled by a not illustrated thermal control unit, may be used. It is preferable that a temperature in the greenhouse gas fixation/elimination apparatus body 1 is maintained within a range between 30° C. and 40° C. A gas introduction port 6 is provided with a check valve 52 to thereby prevent a backward flow of an greenhouse gas from an inflow chamber 45 to the gas introduction port 6.

As stated above, according to this embodiment, since an upper bacteria bed material layer 3 and a lower bacteria bed material layer 4 can be always put under the optimally-thermal environment, it is possible to always and constantly exercise efficiently a greenhouse gas fixation/elimination ability without being affected by a seasonal or geographic temperature variation.

Eighth Embodiment

Figure 12:
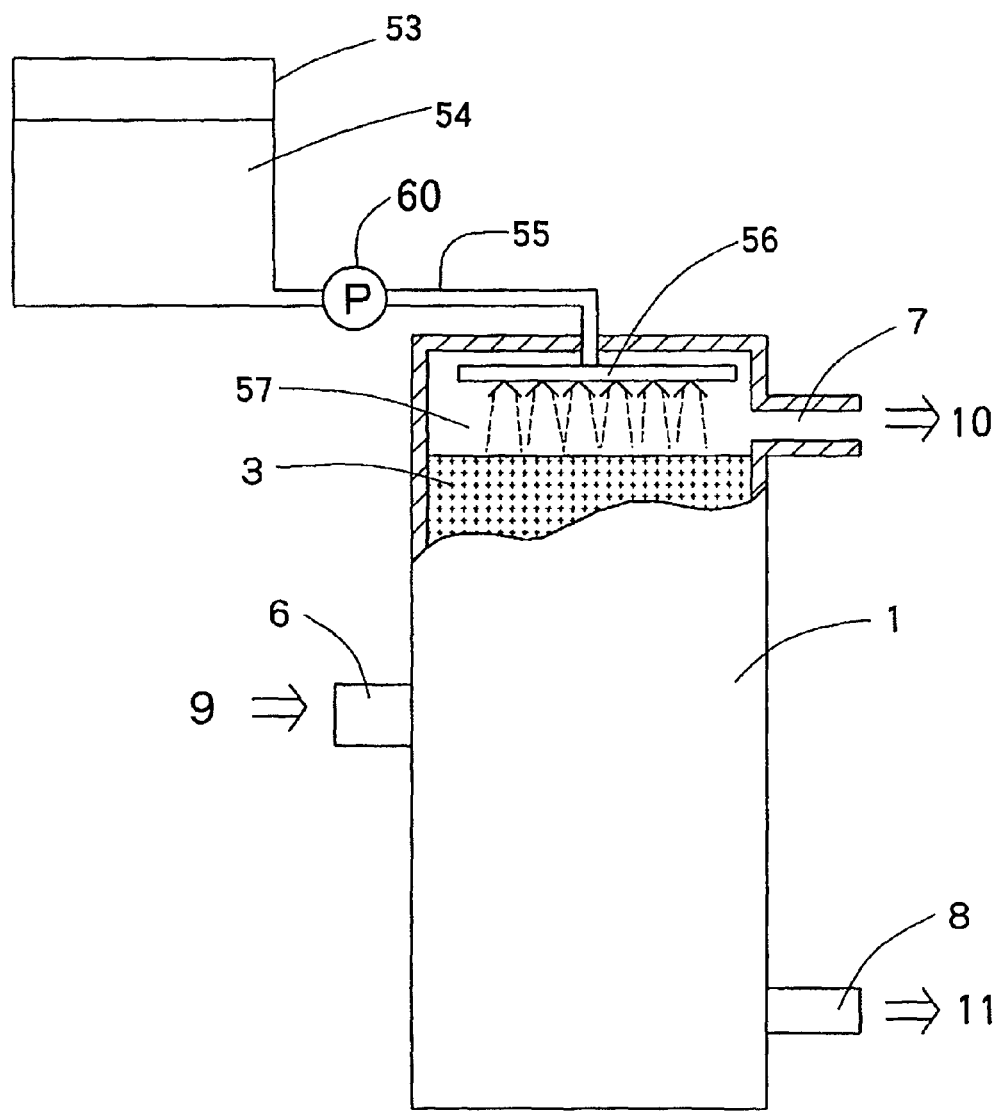
FIG. 12 is a cross-sectional view of an eighth embodiment of the present invention.
Figure 13:
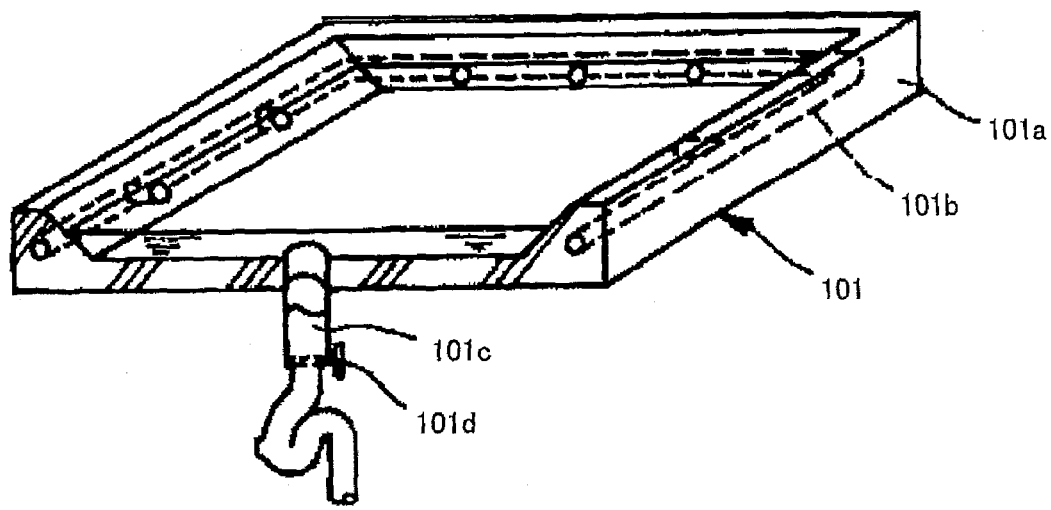
FIG. 13 is a schematic cross-sectional view of a conventional gas decomposition apparatus.
Figure 14:
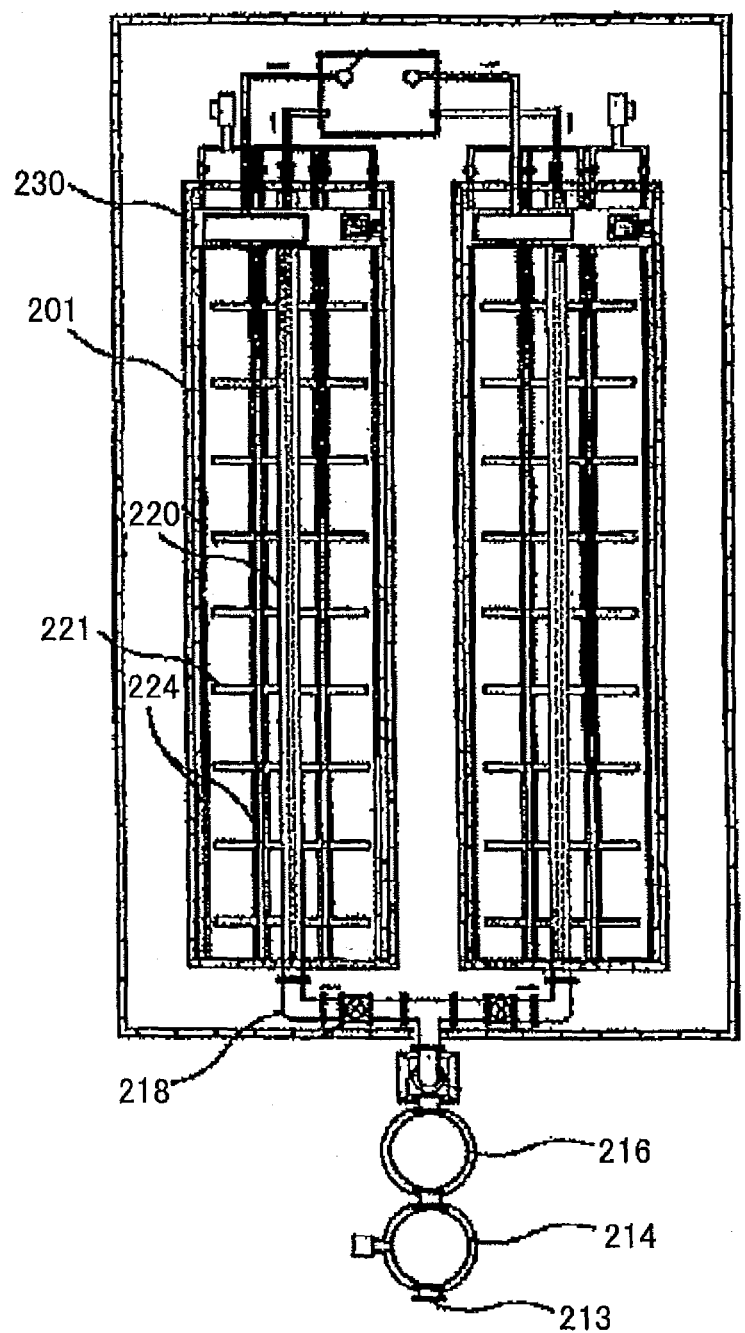
FIG. 14 is a schematic cross-sectional view of another conventional gas decomposition apparatus.

An eighth embodiment of the present invention is depicted in FIG. 12. In this embodiment, it is disclosed that supply of photosynthetic bacteria, other bacteria and so forth for a greenhouse gas fixation/elimination is suitably carried out. Note that, in this eighth embodiment, the same elements as or similar elements to those of the first embodiment (FIGS. 1-5) are indicated by the same references, and that the particular explanations of these elements are omitted.

As shown in FIG. 12, a sprinkler 56 is provided in an upper section of a greenhouse gas fixation/elimination apparatus body 1. A solution tank 53 is connected to the sprinkler 56 through a feeding pipe. A culture solution 54 containing photosynthetic bacteria, other bacteria and so forth is contained in the solution tank 53, and is suitably fed to an upper bacteria bed material layer 3 and a lower bacteria bed material layer 4 by a pump 60, using a flow rate controller having a timer or the like. A supply timing of the culture solution 54 is determined in accordance with a scale or magnitude of the greenhouse gas fixation/elimination apparatus body 1. Note that a nutrition solution for the bacteria in the bacteria bed material layers may be substituted for the culture solution 54. Also, note that a usual water may be contained in the tank, otherwise a water pipe may be directly connected to the tank, but, when the water pipe is directly connected to the tank, it is necessary to remove chlorine from the water.

Also, although not illustrated, the solution tank 53 and the greenhouse gas fixation/elimination apparatus body 1 may be provided with solar panels as a power source for driving the pump 60 and the flow rate controller, otherwise the solar panels may be installed in the vicinity of them. In this case, the supply of either the bacteria or the nutrition solution can be autonomously carried out, and thus it is unnecessary to perform the wiring work outside.

According to this embodiment, the supply of the bacteria can be suitably carried out, it is possible to stably achieve the greenhouse gas fixation/elimination processing.

In this embodiment, although the sprinkler 56 is provided in the upper section of the greenhouse gas fixation/elimination apparatus body 1, another sprinkler may be further provided between the upper bacteria bed material layer 3 and the lower bacteria bed material layer 4. Also, a substitute for both the upper sprinkler and the middle, sprinklers may be provided in the vicinity of a gas introduction port 6, so that a greenhouse gas 9 can be excessively wetted and fed to the upper bacteria bed material layer 3 and the lower bacteria bed material layer 4. Thus, an optimum moisture condition for activity of photosynthetic bacteria, other bacteria and so forth can be obtained in the greenhouse gas fixation/elimination apparatus body 1, and thus it is possible to surely fix and eliminate the greenhouse gas.

Experimental Example (Gas Decomposition Test)

The effect of the gas decomposition apparatus according to Embodiment 1 was investigated, using cultured substances which was obtained by culturing a culture material containing photosynthetic bacteria and lactic acid bacteria under a ventilating condition. Gas decomposition states in the gas decomposition apparatus are shown in Table 1.

TABLE 1

Test Data (Under Aerobic Condition of Photosynthetic Bacteria)

| Introduction Gas | Before Gas Passes Through Apparatus (ppm) | After Gas Passes Through Apparatus (ppm) |
| --- | --- | --- |
| Carbon Monoxide ($CO_1$) | 0.4 | 0.2 |
| Carbon Dioxide ($CO_2$) | 2000 | 1000 |
| Hydrocarbon (HC) | 780 | 600 |

From the results shown in Table 1, it was found that concentrations of the introduction gases introduced into the gas decomposition apparatus were reduced. It could be presumed that these results were due to the fact that the photosynthetic bacteria needed and consumed carbon (C) and hydrogen (H) as energy sources.

The invention claimed is:

1. A gas decomposition apparatus using bacteria selecting and decomposing a specific gas component, which apparatus comprises:

a tubular gas decomposition apparatus body horizontally extending and including a gas introduction port which is provided therein at a middle location between end portions of said tubular gas decomposition apparatus body, and from which a gas to be subjected to a decomposition processing, containing said specific gas component, is introduced into an interior of said tubular gas decomposition apparatus body, upper exhaust ports which are provided therein at top locations of the respective end portions of said tubular gas decomposition apparatus body, and lower exhaust ports which are provided therein at bottom locations of the respective end portions of said tubular gas decomposition apparatus body;

a first bacteria bed material layer, containing bacteria selecting and decomposing said specific gas component, received in the interior of said tubular gas decomposition apparatus body between said gas introduction port and one of the end portions of said tubular gas decomposition apparatus body; and a second bacteria bed material layer, containing bacteria selecting and decomposing said specific gas component, received in the interior of said tubular gas decomposition apparatus body between said as introduction port and the other end portion of said tubular as decomposition apparatus body.

2. The gas decomposition apparatus as set forth in claim 1, wherein said specific gas component is either a greenhouse gas or a stink gas.

3. The gas decomposition apparatus as set forth in claim 1, wherein said gas introduction port includes a fan so that the introduction of the gas to be subjected to the decomposition processing into the interior of said tubular gas decomposition apparatus body is able to be positively carried out.

4. The gas decomposition apparatus as set forth in claim 1, wherein each of said upper exhaust ports and said exhaust ports includes a fan so that the introduction of the gas to be subjected to the decomposition processing into the interior of said tubular as decomposition apparatus body is able to be positively carried out.

5. The gas decomposition apparatus as set forth in claim 1, wherein each of said first and second bacteria bed material layers is composed of a plurality of bacteria bed material layer units which are arranged in such a manner that a number of said bacteria bed material layer units is able to be regulated in each of said first and second bacteria bed material layers.

6. The gas decomposition apparatus as set forth in claim 1, wherein said tubular gas decomposition apparatus body comprises a plurality of dividable segments which are connected to each other, and said bacteria bed material layer is received as a detachable unit in an interior of said gas decomposition apparatus body.

7. The gas decomposition apparatus as set forth in claim 1, wherein said gas introduction port includes a backward-flow prevention device for preventing a backward-flow of the gas to be subjected to the decomposition processing from said tubular gas decomposition apparatus body to said gas introduction port.

8. The gas decomposition apparatus as set forth in claim 7, wherein said backward-flow prevention device includes a tank, an upper section of which is in communication with said tubular gas decomposition apparatus body, and a lower section of which is charged with a liquid, and wherein a porous gas ejector is included in the lower section of said tank, which is fed the gas to be subjected to the decomposition processing.

9. The gas decomposition apparatus as set forth in claim 7, wherein said backward-flow prevention device is a check valve which is provided in said gas introduction port, and which is opened in only a direction from an upstream side of the gas to be subjected to the decomposition processing toward a downstream side thereof.

10. The gas decomposition apparatus as set forth in claim 1, wherein a sprinkler is provided in the upper section of said tubular gas decomposition apparatus body, and is connected to either a tank, in which a liquid containing photosynthetic bacteria and/or other bacteria and so forth is held, or a water pipe for feeding a water.

11. The gas decomposition apparatus as set forth in claim 1, wherein at least one light source is provided in said tubular gas decomposition apparatus body so that both of said first and second bacteria bed material layers are illuminated with said light source.

12. The gas decomposition apparatus as set forth in claim 1, wherein a plurality of light sources are provided in said tubular gas decomposition apparatus body, so that both of said first and second bacteria bed material layers are entirely illuminated with said light sources in said tubular gas decomposition apparatus body.

13. A gas decomposition apparatus using bacteria selecting and decomposing a specific gas component, which apparatus comprises:

a tubular gas decomposition apparatus body vertically extending and including a gas introduction port which is provided therein at a lower location of said tubular gas decomposition apparatus body, and from which a as to be subjected to a decomposition processing, containing said specific gas component, is introduced into an interior of said tubular gas decomposition apparatus body, an upper exhaust port which is provided therein at an upper location of said tubular gas decomposition apparatus body, and a lower exhaust port which is provided therein at a lower location of said tubular gas decomposition apparatus body;

a partition provided in a lower interior section of said tubular gas decomposition apparatus body so as to divide it into a first chamber, which is in communication with said gas introduction port, and a second chamber, which is in communication with said lower exhaust port; and a bacteria bed material layer, containing bacteria selecting and decomposing said specific gas component, received in the interior of said tubular gas decomposition apparatus body, so that an upper opening of said first chamber is plugged with said bacteria bed material layer whereby the gas to be subjected to the decomposition processing is able to pass through said bacteria bed material layer.

14. The gas decomposition apparatus as set forth in claim 13, wherein said bacteria for eliminating a greenhouse gas or decomposing a stink gas comprises photosynthetic bacteria.

15. The gas decomposition apparatus as set forth in claim 13, wherein said bacteria for eliminating a greenhouse gas or decomposing a stink gas comprises chemoautotrophic bacteria.

16. The gas decomposition apparatus as set forth in claim 13, wherein said bacteria for eliminating a greenhouse gas or decomposing a stink gas comprises mixed-cultured bacteria containing photosynthetic bacteria, chemo-mixotrophic bacteria and chemoautotorophic bacteria.

17. The gas decomposition apparatus as set forth in claim 16, wherein said bacteria bed material layer contains a nutrition substance, and further contains lactic acid bacteria.

18. The gas decomposition apparatus as set forth in claim 16, wherein said lactic acid bacteria comprises one or more kinds of lactic acid bacteria selected from the group comprising *lactobacillus acidophilus, lactobacillus plantarum, lac-*

*tobacillus brevis, lactobacillus salivarius, lactobacillus pentose, lactobacillus reuteri*, and *lactobacillus casei*.

* * * * *